United States Patent [19]

Voet

[11] 4,131,703
[45] Dec. 26, 1978

[54] FIRE-RESISTANT CONSTRUCTION, METHOD OF MAKING SAME, AND CARPET CONSTRUCTION EMPLOYING SAME

[75] Inventor: Harry C. Voet, Cincinnati, Ohio

[73] Assignee: Dayco Corporation, Dayton, Ohio

[21] Appl. No.: 879,024

[22] Filed: Feb. 17, 1978

[51] Int. Cl.² ................................................. B32B 3/26
[52] U.S. Cl. ....................................... 428/95; 156/148;
428/234; 428/235; 428/310; 428/313; 428/315;
428/913; 428/921
[58] Field of Search .................. 428/95, 234, 235, 300,
428/301, 310, 313, 315, 920, 921, 913; 156/148

[56] References Cited

U.S. PATENT DOCUMENTS

| | | | |
|---|---|---|---|
| 3,467,569 | 9/1969 | Weber et al. | 428/315 |
| 3,702,797 | 11/1972 | Cochran | 428/95 |
| 3,728,204 | 4/1973 | Cochran | 428/95 |
| 3,778,337 | 12/1973 | Mand et al. | 428/921 |
| 3,833,951 | 9/1974 | Hurwitz | 428/315 |
| 3,934,066 | 1/1976 | Murch | 428/921 |

Primary Examiner—William J. Van Balen
Attorney, Agent, or Firm—Reuben Wolk

[57] ABSTRACT

A fire-resistant construction and method of making same is provided wherein such construction comprises a cellular layer of an elastomeric material and a sheet of metallic foil fixed against the layer with the sheet serving to dissipate heat from any portion of the cellular layer subjected to heat of an ignition source to thereby help provide the construction with its fire-resistant character. A cushion and carpet construction employing such fire-resistant construction are also provided.

24 Claims, 11 Drawing Figures

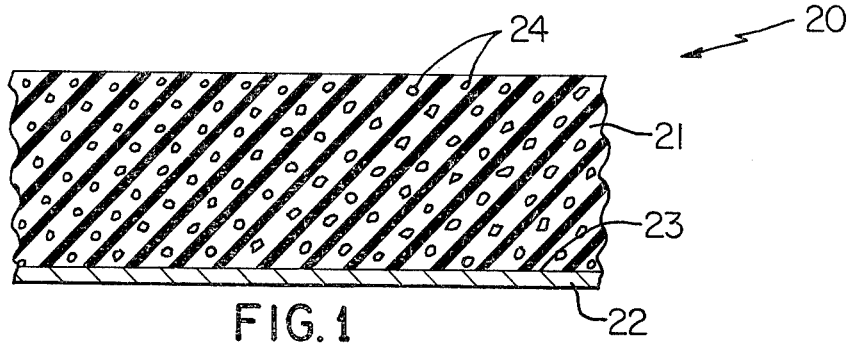
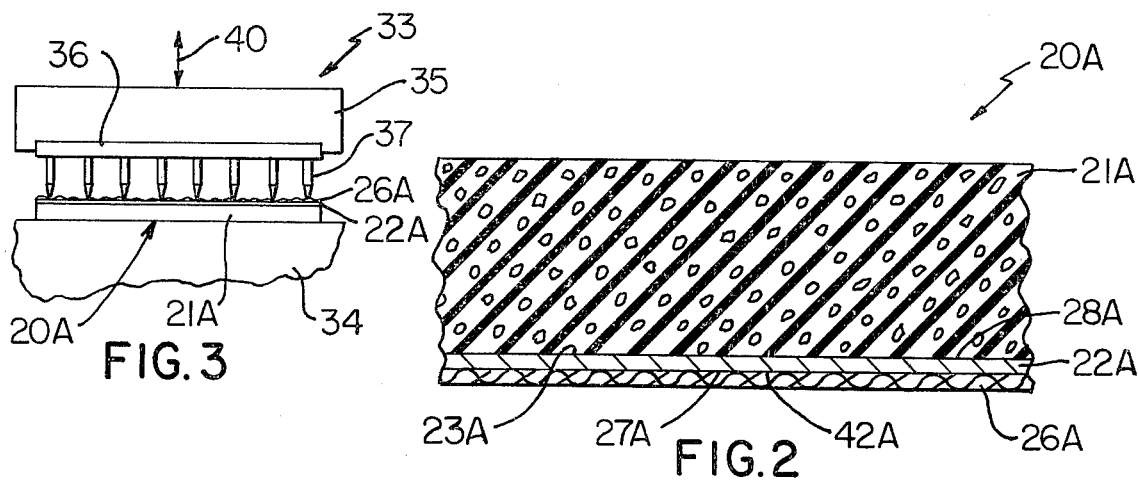
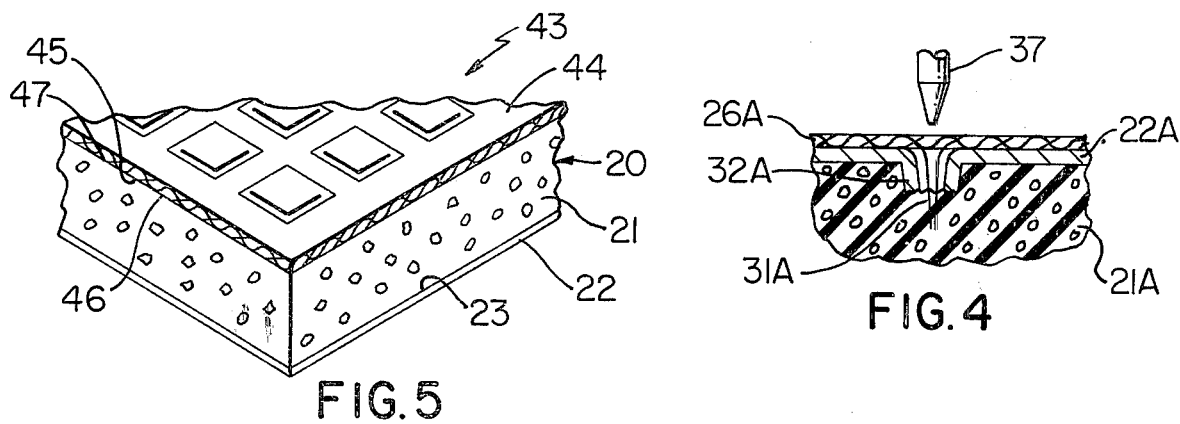
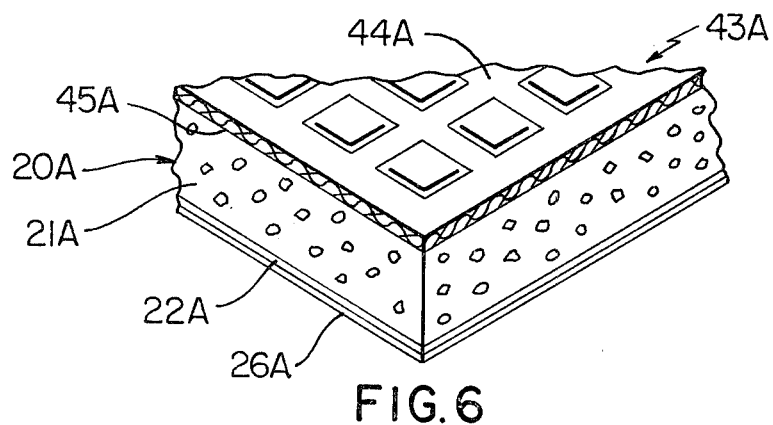

FIRE-RESISTANT CONSTRUCTION, METHOD OF MAKING SAME, AND CARPET CONSTRUCTION EMPLOYING SAME

BACKGROUND OF THE INVENTION

There is a need in the art for a fire-resistant construction capable of being used in carpet constructions, upholstered furniture, mattresses, cushions of all types, pillows, covered wall panels, ceiling panels, and the like. However, most of the constructions of this type proposed heretofore are comparatively expensive thereby limiting their use.

SUMMARY

It is a feature of this invention to provide a simple and comparatively inexpensive fire-resistant construction capable of being used in the above-mentioned applications.

Another feature of this invention is to provide a fire-resistant construction comprising a cellular layer of an elastomeric material and a sheet of metallic foil fixed against the layer with the sheet serving to dissipate heat from any portion of the cellular layer subjected to heat of an ignition source to thereby help to provide the construction with its fire-resistant character.

Another feature of this invention is to provide a construction of the character mentioned particularly adapted for use in a cushion construction for upholstered furniture.

Another feature of this invention is to provide a fire-resistant construction of the character mentioned particularly adapted for use in a carpet construction either as an integral part thereof or as a separate underlay therefor.

Another feature of this invention is to provide a fire-resistant construction of the character mentioned wherein the elastomeric material is a foam latex which when subjected to heat starts decomposing to initially generate water vapor which helps cool the cellular layer, releases a flame retardant with further decomposition, and forms a char layer with still further decomposition which helps insulate the cellular layer from heat while limiting oxygen flow thereto.

Another feature of this invention is to provide a method of making a fire-resistant construction of the character mentioned.

Therefore it is an object of this invention to provide an improved fire-resistant construction, method of making same, and cushion construction and carpet construction employing same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a fragmentary cross-sectional view illustrating one exemplary embodiment of a fire-resistant construction of this invention;

FIG. 2 is a view similar to FIG. 1 illustrating another exemplary embodiment of the fire-resistant construction of this invention;

FIG. 3 illustrates a method step employed in making the carpet construction of FIG. 2;

FIG. 4 is an enlarged fragmentary cross-sectional view particularly illustrating the construction as defined by the method disclosed in FIG. 3;

FIG. 5 is a fragmentary perspective view illustrating an exemplary carpet construction of this invention employing the fire-resistant construction of FIG. 1;

FIG. 6 is a view similar to FIG. 5 illustrating another exemplary embodiment of a carpet construction employing the fire-resistant construction of FIG. 2;

DESCRIPTION OF ILLUSTRATED EMBODIMENTS

Figure 7:
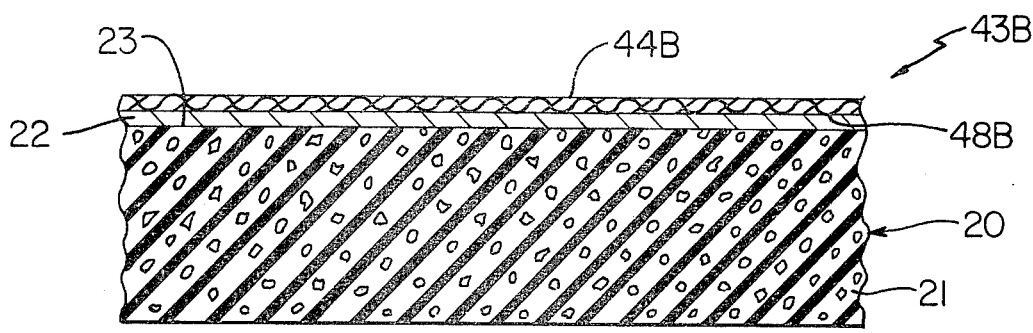
FIG. 7 is a fragmentary cross-sectional view illustrating still another exemplary embodiment of a carpet construction of this invention.

Reference is now made to FIG. 1 of the drawings which illustrates one exemplary embodiment of a fire-resistant construction of this invention which is designated generally by the reference numeral 20 and the construction 20 is of the type which is particularly adapted to be used in the various applications including the applications mentioned previously in this specification. The construction 20 comprises a cellular layer 21 made of a compressible and yieldable elastomeric material and a sheet 22 of metallic foil fixed against the layer 21 with the sheet 22 serving to dissipate heat from any portion of the cellular layer 21 subjected to the heat of an ignition source to thereby help provide the construction with its fire-resistant character. The layer 21 and sheet 22 may be fixed together by any suitable fixing means 23.

The sheet 22 may be any suitable metallic foil known in the art including foil made of ferrous metals as well as non-ferrous metals. Preferably the sheet 22 is made of metallic foil containing aluminum; and, as is known in the art such foil is usually in the form of a rolled product of rectangular cross section which has a thickness less than 0.006 inch.

The cellular layer 21 is preferably in the form of an elastomeric material such as a compressible yet resilient foam latex which has special properties. In particular, the properties are such that when the foam latex is subjected to heat of an ignition source it starts decomposing to initially generate water vapor which helps cool the cellular layer, releases a flame retardant with further decomposition, and forms a char layer with still further decomposition which helps insulate said cellular layer and adjoining structure from heat while limiting oxygen flow thereto. Although any suitable foam latex material may be used which is capable of providing performance as indicated herein, an example of a material which has been used satisfactorily will be presented subsequently.

The cellular layer 21 is a foam latex layer characterized by the usual voids therein which are disposed throughout in a substantially random manner and a representative few of such voids are designated by the reference numeral 24. The voids 24 may be controlled within a size range as is known in the art and such voids 24 cooperate with the polymeric material in which they are defined to impart a compressible and resilient character to the layer 21.

The layer 21 may be made of a suitable synthetic plastic material or a rubber material and for ease of presentation layer 21 has been cross hatched in the drawings as being made of rubber. Accordingly, layer 21 may be in the form of a neoprene rubber foam latex, a butadiene-styrene rubber (SBR) foam latex, or a vinyl foam latex.

As previously indicated, layer 21 and sheet 22 may be suitably fixed together by suitable fixing means 23 and such fixing means may be considered and referred to as bonding means 23. The bonding means 23 may be provided simply by the adhesive action produced by heat curing the foam layer 21 against the sheet 22. For example, the sheet 22 may have uncured latex foam disposed thereon at a controlled height whereupon such sheet of latex foam may be moved into a suitable curing apparatus which may include a gel oven for initial gelling and partial curing and a final curing tunnel or oven to complete the construction. With this procedure it will be appreciated that the bonding means 23 is in essence a self-bonding action provided by heat curing the layer 21 against the sheet 22.

The bonding means 23 may also be in the form of an adhesive also designated by the reference numeral 23. Any suitable adhesive may be employed for this purpose including a butadiene-styrene rubber latex, vinyl latex, and the like. The bonding means or adhesive 23 disposed between layer 21 and sheet 22 may have any desired thickness and may be provided employing any technique known in the art for this purpose.

Another exemplary embodiment of the fire-resistant construction of this invention is illustrated in FIGS. 2-4 of the drawings. The construction illustrated in FIGS. 2-4 is very similar to the construction 20; therefore, such construction will be designated generally by the reference numeral 20A and parts of the construction 20A which are very similar to corresponding parts of the construction 20 will be designated by the same reference numerals as in the construction 20 also followed by the letter designation A and not described again in detail. Only those component parts of the construction 20A which are substantially different from construction 20 will be designated by a new reference numeral also followed by the letter designation A and described in detail.

The construction 20A has a fibrous layer 26A which for ease of presentation is shown in the drawings by the symbol for a fabric material; however, it will be appreciated that the fibrous layer may be a fabric material made of any suitable fabric employed in the art including a woven fabric regardless of the type of weave or a non-woven fabric including a fabric defined by a fibrous mat which has individual fibers thereof suitably held together in a sheet-like form by fusion therebetween or by any suitable adhesive material, or the like.

The fibrous layer 26A is attached against the sheet 22A on surface 27A thereof which is remote from surface 28A of sheet 22A. The fibrous layer 26A may be attached against the sheet 22A and layer 21A solely by a plurality of fibers 31A thereof as shown in FIG. 4 which extend through tubular integral columns 32A defined in the sheet 22A as seen in FIGS. 3 and 4 and as will now be described.

The columns 32A provide substantial contact between the sheet 22A and the cellular layer 21A and such integral columns are defined by any suitable technique such as by needle punching the sheet 22A into the layer 21A and as shown in FIG. 3. With this substantial contact, it will be appreciated that sheet 22A may be held to cellular layer 21A solely by the mechanical contact produced by needle punching sheet 22A into layer 21A. Nevertheless, adhesive means 23A may be employed if desired to help hold layer 21A and sheet 22A together. The needle punching is preferably employed to fasten layer 26A, sheet 22A and layer 21A and is achieved using punching apparatus 33 and such apparatus has a fixed lower support 34 for disposing the cellular layer 21A, sheet 22A, and layer 26A thereon. The apparatus 34 also has a vertically reciprocable platen 35 which has a lower structure 36 provided with needles or special punching spikes 37 fixed thereof. The platen 35 is reciprocated vertically upwardly and downwardly by a suitable actuating mechanism designated by a double arrow 40.

The needle punching action is achieved by placing a cellular layer 21A on the lower support 34 and then disposing the sheet 22A and layer 26A thereon. The platen 35 and needles 37 are then urged toward and through the layer 26A and sheet 22A, by the mechanism 40 causing the severing of holes in sheet 22A and the formation of integral tubular columns 32A in sheet 22A. The integral tubular columns 32A provide substantially more contact surface between the sheet 22A and the cellular layer 26A then would be present if punching needles 37 were not used.

As indicated above, the needle punching action is achieved with the fibrous layer 26A disposed on the sheet 22A and as each needle 37 is forced through the layer 26A, fibers 31A are engaged by each needle 37 and are extended through the tubular columns 32A and wedged into the matrix-like portion of the cellular layer 21A whereupon the fibers 31A serve as interconnecting beams interconnecting the fibrous layer 26A, sheet 22A, and cellular layer 21A. It has been found that the spacing and size of needles 37 may be such that the layer 27A and sheet 22A are, in essence, self-held together by the needles 37 engaging and pushing individual fibers 31A into the cellular layer 21A.

It will be appreciated that, if desired, suitable adhesive or bonding means 42A may be also interposed between fibrous layer 26A and the sheet 22A. Likewise and as mentioned above, suitable adhesive or bonding means 23A may be provided between the cellular layer 21A and the sheet 22A, or layer 21A may be bonded to sheet 22A by a heat curing action.

Each construction 20 and 20A may be used as a cushion construction, carpet construction, or the like; however, regardless of use or application, the respective layers 21 and 21A are made of a compressible and resilient material.

In the construction 20, for example, the layer or web 21 thereof may be premade or preconstructed and provided on a supply roll thereof; and, the web or sheet 22 may be similarly premade and provided on a supply roll thereof. The layer 21 and sheet 22 are then brought together with adhesive layer 23 disposed therebetween and compressed between a pair of nip rolls in accordance with techniques known in the art to define the construction 20. A similar technique may be employed to form a two part laminate (defined by parts 20A and 21A) of construction 20A prior to fastening fibrous layer 26A in position thereon with or without needle punching. Also, a two part laminate comprised of layer 21A and 22A may be made by disposing uncured foam on sheet 22A and then curing same to provide a self-bonding action. The fibrous layer 26A may then be attached or bonded in position, as desired.

Having described constructions 20 and 20A, reference is now made to FIG. 5 of the drawings which illustrates a fire-resistant self-padded carpet construction of this invention which is designated generally by the reference numeral 43. The carpet construction 43 employs the fire-resistant construction 20 of FIG. 1 as an integral part thereof and, in essence, construction 20 defines integral padding of the carpet construction 43. As described previously, the construction 20 has cellular layer 21 and sheet 22 bonded together by suitable bonding means 23.

The construction 43 also has a carpet wear layer 44 suitably bonded in position utilizing any technique known in the art. The layer 44 is bonded employing adhesive means 45 between its bottom surface 46 and the top surface 47 of the cellular layer 21. Accordingly, it will be seen that the wear layer 44 is attached against the cellular layer 21 on the surface 47 thereof which is remote from sheet 22.

Another exemplary embodiment of a self-padded or self-cushioned fire resistant carpet construction of this invention is illustrated in FIG. 6 and designated by the general reference numeral 43A. The carpet construction 43A employs the fire resistant construction 20A of FIGS. 2-4 instead of employing the construction 20. Accordingly, carpet construction 43A has a wear layer 44A and construction 20A suitably bonded by adhesive means 45A against the cellular layer 21A of construction 20A. The construction 20A also has sheet 22A and fibrous layer 26A and construction 20A may be made as described previously.

Another exemplary embodiment of a self-padded carpet construction of this invention is illustrated in FIG. 7 of the drawings and designated by the reference numeral 43B. The carpet construction of FIG. 7 employs fire resistant construction 20 of FIG. 1 with its cellular layer 21, metal foil sheet 22, and bonding means 23; however, it will be seen that the wear layer 44B thereof is bonded against the metal foil sheet 22 and such bonding is preferably achieved utilizing any suitable bonding means known in the art such as an adhesive 48B.

The fire resistant construction 20 is shown comprising an integral part of each carpet construction 43 and 43B and construction 20A is shown comprising an integral part of construction 43A. However, it will be appreciated that each construction 20 and 20A may be employed as a carpet underlay in combination with a standard carpet and as will now be described in connection with the embodiments of FIGS. 8, 9, and 10.

Figure 8:
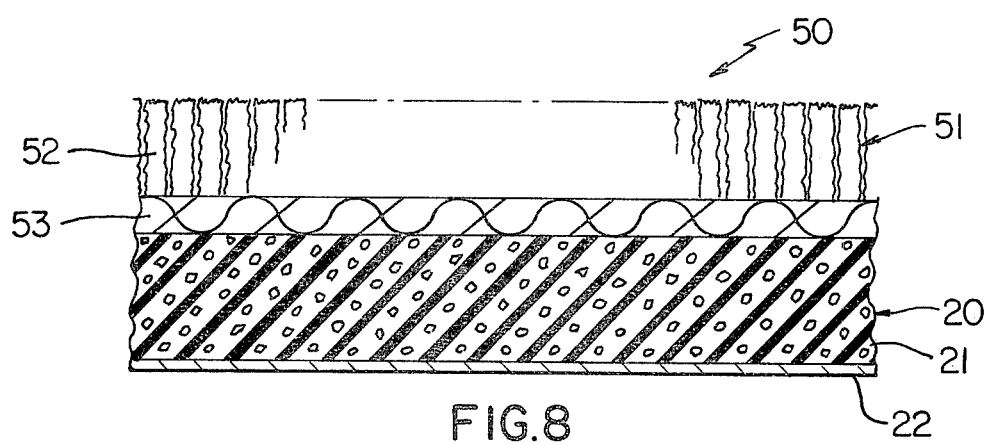
FIG. 8 is a fragmentary cross-sectional view of a carpet construction of this invention, comprised of a fire-resistant construction and a carpet.

In particular, it will be seen that in FIG. 8 a combination 50 is illustrated comprising a carpet 51 having a wear layer 52 and a backing layer 53 with the wear layer 52 and backing layer 53 being of any suitable known construction. The carpet 51 is supported on the fire resistant construction 20 of FIG. 1 which is defined by cellular layer 21 and metal foil sheet 2 suitably bonded together. The carpet 51 is supported on the construction 20 free of or without adhesive or bonding means between the backing layer 53 of carpet 51 and the cellular layer 21; and, the construction 20 serves as an underlay pad or cushion for carpet 51.

Figure 9:
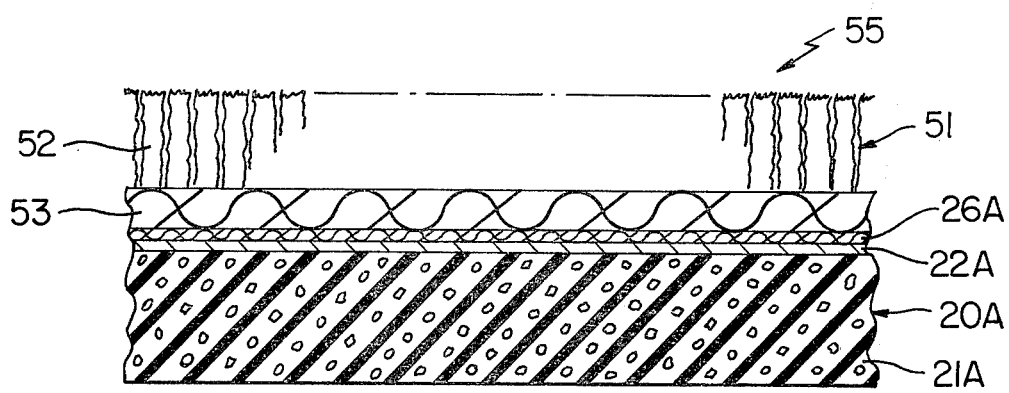
FIG. 9 is a view similar to FIG. 8 illustrating another exemplary embodiment of a carpet construction of this invention.

FIG. 9 illustrates another combination 55 wherein the fire resistant construction 20A is employed as a carpet underlay pad or cushion beneath a carpet 51 having a wear layer 52 and backing layer 53. The construction 20A in this instance is disposed with its cellular layer 21A as the lowermost layer followed by the metal foil sheet 22A and then the fibrous layer 26A. The backing layer 53 is disposed on the fibrous layer 26A free of adhesive means or other attaching means therebetween.

Figure 10:
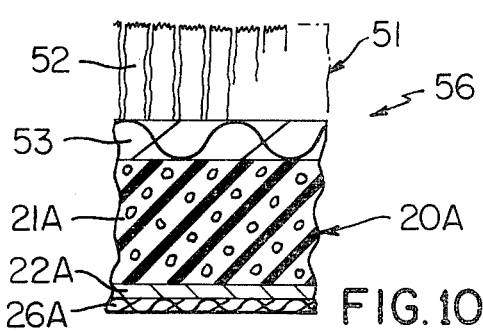
FIG. 10 is a view similar to FIG. 8 illustrating another exemplary embodiment of a carpet construction of this invention.

Another combination 56 is illustrated in FIG. 10 of the drawings and such combination employs fire-resistant construction 20A. The construction 20A is used as an underlay pad or cushion and is positioned essentially as shown in FIG. 2 of the drawings whereby the fibrous layer 26A is the lowermost layer, followed by sheet 22A, and cellular layer 21A whereby the backing layer 53 of the carpet 51 is disposed against the exposed surface of the cellular layer 21A and the wear layer 52 defines the top surface of the carpet 51 in the usual manner.

Figure 11:
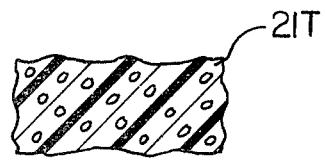
FIG. 11 is a fragmentary cross-sectional view showing a typical cellular layer, which may comprise the fire-resistant construction of this invention, made of a synthetic plastic material.

Each construction 20 and 20A is disclosed in the drawings with suitable cross hatching to indicate the compressible resilient layer is made of rubber and such rubber is as described earlier or may be in the form of sponge rubber. However, it will be appreciated that in each embodiment disclosed in the drawings synthetic plastic foam may be employed instead of foam rubber; and, to highlight this point reference is made to FIG. 11 of the drawings which shows a typical cellular layer which is designated by the reference numeral 21T. Each of the constructions of FIGS. 1, 2, 3, 4, 5, 6, 7, 8, 9, and 10 may thus be made and drawn with its cellular layer made of synthetic plastic wuch as a vinyl foam latex, for example.

The foam latex which is used to define a cellular layer 21, 21A, or 21T is preferably defined in terms of its properties. In particular, when such foam latex is subjected to the heat of an ignition source it starts decomposing to initially generate water vapor which helps cool the cellular layer, releases a flame retardant with further decomposition, and forms a char layer still further decomposition which helps insulate the cellular layer from heat while limiting oxygen flow thereto. Although any suitable foam latex (capable of meeting these performance requirements) may be employed, in one application of this invention a material which met these performance characteristics was a cellular material made by the E. I. Dupont de Nemours and Company of Wilmington, Del. 19898 and sold under the registered trademark of "VONAR."

While present exemplary embodiments of this invention, and methods of practicing the same, have been illustrated and described, it will be recognized that this invention may be otherwise variously embodied and practiced within the scope of the following claims.

What is claimed is:

1. A fire-resistant construction comprising; a cellular layer of an elastomeric material and a sheet of metallic foil fixed against said layer; said sheet serving to dissipate heat from any portion of said cellular layer subjected to heat of an ignition source to thereby help provide said construction with its fire-resistant character; said elastomeric material consisting of a foam latex which when subjected to said heat, starts decomposing to initially generate water vapor which helps cool said cellular layer, releases a flame retardant with further decomposition, and forms a char layer with still further decomposition which helps insulate said cellular layer from heat while limiting oxygen flow thereto.

2. A construction as set forth in claim 1 in which said sheet has a plurality of integral tubular columns disposed within said cellular layer, said columns providing additional mechanical contact between said sheet and cellular layer to help hold said sheet and cellular layer together.

3. A construction as set forth in claim 2 in which said metallic foil is a metallic foil containing aluminum and further comprising a fibrous layer attached against said sheet on that surface thereof remote from said cellular layer.

4. A construction as set forth in claim 3 and further comprising a plurality of fibers of said fibrous layer extending through said tubular columns and into said cellular layer, said fibers serving as interconnecting beams which interconnect said fibrous layer, said sheet, and said cellular layer.

5. A construction as set forth in claim 1 and further comprising means bonding said layer and sheet together.

6. A construction as set forth in claim 5 in which said bonding means comprises a self-bonding action produced by heat curing said layer against said sheet.

7. A construction as set forth in claim 5 in which said bonding means comprises an adhesive interposed between said layer and sheet.

8. A construction as set forth in claim 1 in which said foam latex is a neoprene rubber foam latex.

9. A construction as set forth in claim 1 in which said foam latex is a butadiene - styrene rubber latex.

10. A construction as set forth in claim 1 in which said foam latex is a vinyl foam latex.

11. A fire-resistant cushion construction comprising: a cellular layer of a compressible resilient elastomeric material and a sheet of metallic foil fixed against said layer; said sheet serving to dissipate heat from any portion of said cellular layer subjected to heat of an ignition source to thereby help provide said construction with its fire-resistant character; said elastomeric material consisting of a foam latex which when subjected to said heat, starts decomposing to initially generate water vapor which helps cool said cellular layer, releases a flame retardant with further decomposition, and forms a char layer with still further decomposition which helps insulate said cellular layer from heat while limiting oxygen flow thereto.

12. A fire-resistant carpet construction comprising; a cellular layer of resilient elastomeric material and a sheet of metallic foil fixed against said layer; said sheet serving to dissipate heat from any portion of said cellular layer subjected to heat of an ignition source to thereby help provide said construction with its fire-resistant character; said elastomeric material consisting of a foam latex which when subjected to said heat, starts decomposing to initially generate water vapor which helps cool said cellular layer, releases a flame retardant with further decomposition, and forms a char layer with still further decomposition which helps insulate said cellular layer from heat while limiting oxygen flow thereto.

13. A construction as set forth in claim 12 and further comprising a carpet wear layer attached against said cellular layer on that surface thereof remote from said sheet.

14. A construction as set forth in claim 12 and further comprising a fibrous layer attached against said sheet on that surface thereof remote from said cellular layer.

15. A construction as set forth in claim 12 and further comprising a carpet wear layer attached against said sheet.

16. In combination: a fire-resistant carpet underlay construction and a carpet disposed on said underlay construction; said carpet having a wear layer and a backing layer with said backing layer adjoining said underlay construction; said underlay construction comprising a cellular layer of compressible resilient elastomeric material and a sheet of metallic foil fixed against said layer; said sheet serving to dissipate heat from any portion of said cellular layer subjected to heat of an ignition source to thereby help provide said construction with its fire-resistant character; said elastomeric material consisting of a foam latex which when subjected to said heat, starts decomposing to initially generate water vapor which helps cool said cellular layer and carpet, releases a flame retardant with further decomposition, and forms a char layer with still further decomposition which helps insulate said cellular layer and carpet from heat while limiting oxygen flow thereto.

17. A combination as set forth in claim 16 in which said backing layer is disposed against said cellular layer.

18. A combination as set forth in claim 16 and further comprising a fibrous layer attached against said sheet on that surface thereof remote from said cellular layer, said backing layer being disposed on said cellular layer.

19. A combination as set forth in claim 16 and further comprising a fibrous layer attached against such sheet on that surface thereof remote from said cellular layer, said backing layer being disposed on said fibrous layer.

20. A method of making a fire resistant construction comprising the steps of; providing a sheet of metallic foil; providing a cellular layer of an elastomeric material in the form of a foam latex which when subjected to heat of an ignition source starts decomposing to initially generate water vapor which helps cool said cellular layer, releases a flame retardant with further decomposition, and forms a char layer with still further decomposition which helps insulate said cellular layer from heat while limiting oxygen flow thereto; and fixing said cellular layer against said sheet; said sheet serving to dissipate heat from any portion of said cellular layer subjected to said heat of said ignition source; said cellular layer and sheet cooperating to provide said construction with its fire resistant character.

21. A method as set forth in claim 20 in which said step of providing a sheet of metallic foil comprises providing said sheet made of metallic foil containing aluminum.

22. A method as set forth in claim 21 in which said fixing step comprises needle punching said sheet of said cellular layer with a plurality of needles to define a plurality of integral tubular columns in said sheet which extend into said cellular layer, said columns providing substantial frictional contact between said sheet and said cellular layer and serving to hold same together.

23. A method as set forth in claim 22 and comprising the further step of disposing a fibrous layer against said sheet and said fixing step comprises needle punching through said fibrous layer, sheet and cellular layer, said needle punching causing a plurality of fibers of said fibrous layer to be urged through said tubular columns and into said cellular layer to be surrounded by the elastomeric material of said cellular layer, said fibers serving as interconnecting columns interconnecting said fibrous layer, sheet, and cellular layer.

24. A method as set forth in claim 23 comprising the further step of adhesively bonding said fibrous layer, cellular layer, and sheet together.

* * * * *